L. SIEBENHAUER.
SAFETY DEVICE FOR ELECTRICAL SYSTEMS.
APPLICATION FILED SEPT. 27, 1915.

1,224,330.

Patented May 1, 1917
3 SHEETS—SHEET 1.

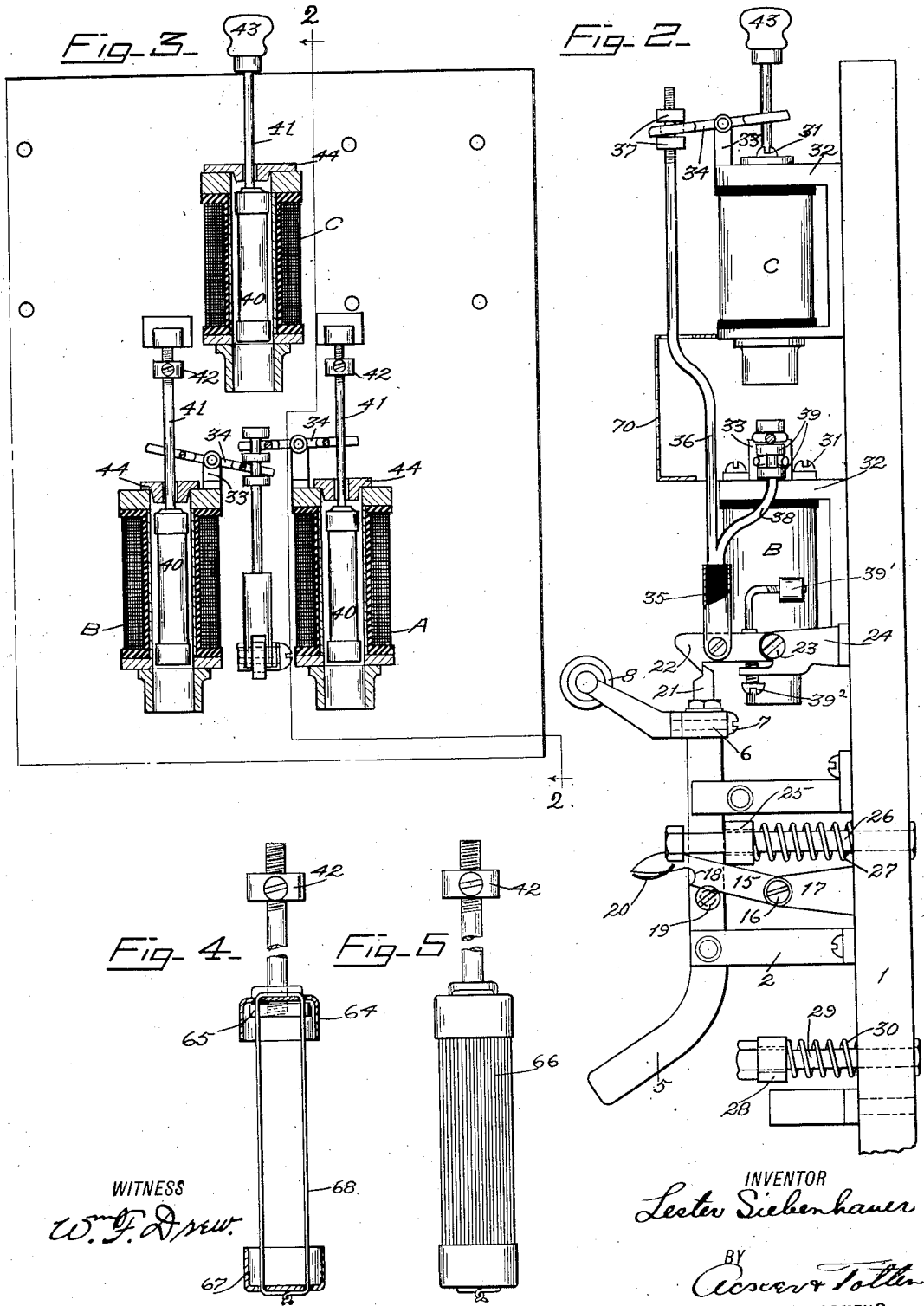

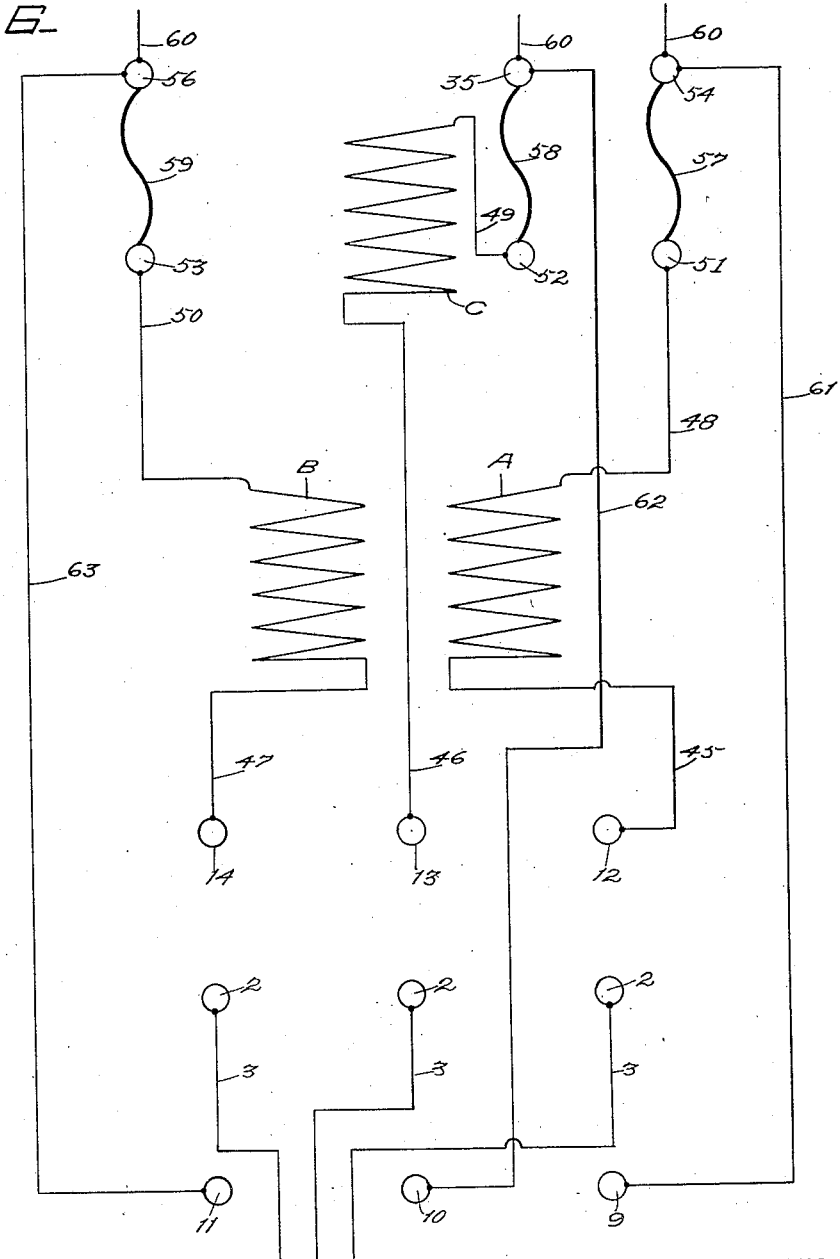

UNITED STATES PATENT OFFICE.

LESTER SIEBENHAUER, OF SAN FRANCISCO, CALIFORNIA, ASSIGNOR TO DRENDELL ELECTRICAL AND MANUFACTURING COMPANY, OF SAN FRANCISCO, CALIFORNIA, A CORPORATION OF CALIFORNIA.

SAFETY DEVICE FOR ELECTRICAL SYSTEMS.

1,224,330.  Specification of Letters Patent.  Patented May 1, 1917.

Application filed September 27, 1915. Serial No. 52,848.

*To all whom it may concern:*

Be it known that I, LESTER SIEBENHAUER, a citizen of the United States, residing in the city and county of San Francisco and State of California, have invented certain new and useful Improvements in Safety Devices for Electrical Systems, of which the following is a specification.

Electrically operated motors as at present connected to be operated by alternating current of one or more phases or wires are often burned out or cooked owing to the interruption of the current of one or more phases or wires while the current of the remaining phases remains in circuit, or owing to the interruption of the entire current for a time, and the flowing thereof again after the motor has come to a point of rest.

The present apparatus is adapted to overcome the burning out of the motor by the above causes and is designed for positioning between the source of supply and the motor, in a single or multiple phase system or in a single or multiple phase system having multiple wires, or in any system having one or more feed wires, to break the connection with the motor on the interruption of the source of supply.

The invention has for its principal objects to provide an apparatus controlled and normally maintained in set position by the source of current supply and after being manually positioned to connect the motor and source of supply will remain in its set position, and will automatically operate to break the connection between the motor and the source of power on the interruption of any portion of the current supply; to provide a device wherein the actuating means for the controlling switch is maintained in suspension by the flow of current from the source of supply, and on the interruption of the current will be permitted to operate to release the controlling switch; to provide a structure having a double throw switch so constructed as to necessitate the operation thereof in a certain cycle that the motor cannot be started by throwing the switch into motor running position and so that the speed of the motor will not be materially diminished during the operation of the switch from starting to running position.

With the above mentioned and other objects in view, the invention consists in the novel construction and combination of parts hereinafter described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

To more fully comprehend the invention, reference is directed to the accompanying drawings, wherein—

Fig. 2 is a view in side elevation with the upper portion in section taken on line 2—2 of Fig. 3, disclosing the switch, the retaining pawl, certain of the solenoids, and the pawl for locking the switch to be operated in a certain cycle of movement.

Fig. 3 is a view in detail of the upper portion of the device with the solenoids in section, disclosing the armatures in the solenoids, the pivoted retaining pawl for coöperation with the switch, and the pivoted levers associated with certain of the armatures to be actuated on the dropping thereof to release the pawl from the switch.

Fig. 4 is a view in section of one of the armatures, disclosing the construction thereof.

Fig. 5 is a view in elevation of one of the armatures.

Fig. 6 is a diagrammatic view of the wiring of the various parts.

Figure 1:
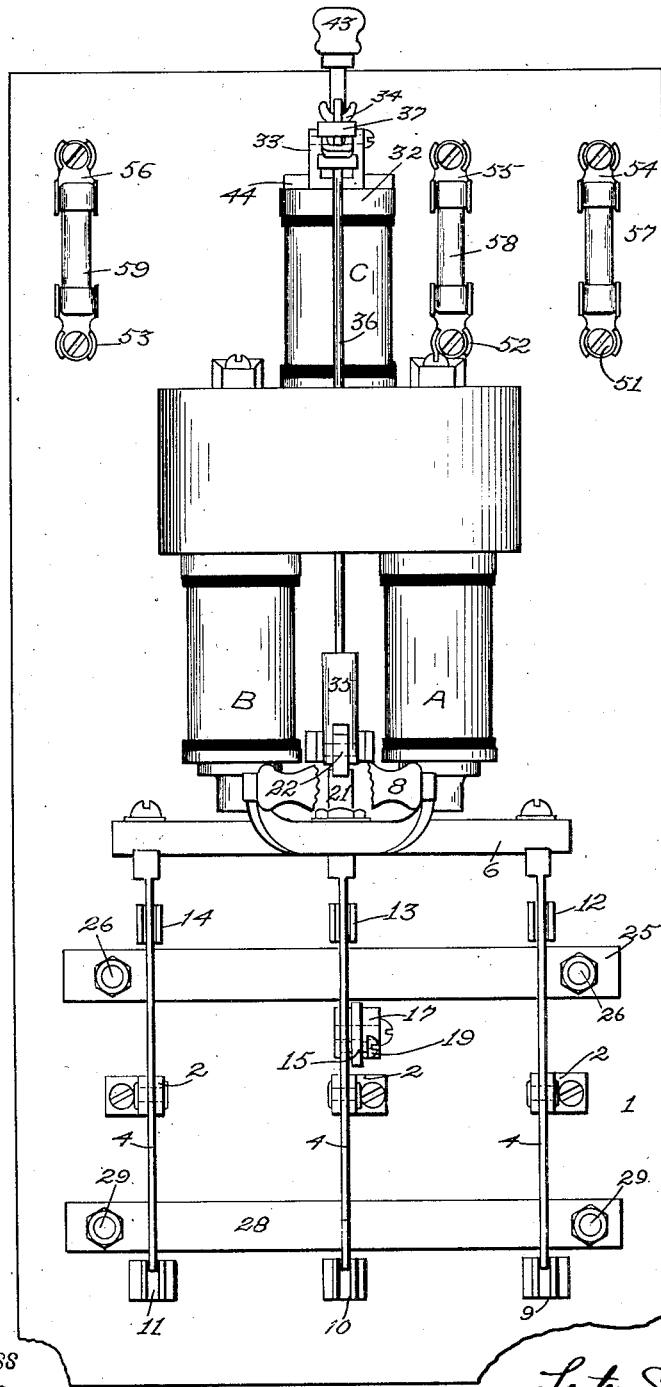
Figure 1 is a view in front elevation of an embodiment of my invention, disclosing the double throw switch, the solenoids, and the pivoted retaining pawl.

While the invention is disclosed in connection with a three phase system, it is to be understood that the same may be employed in connection with a system of any number of wires, just so long as a solenoid is associated with each wire.

Referring more particularly to the several views of the drawings, wherein like characters of reference designate corresponding parts, 1 indicates a suitable panel board on which is mounted the switch blade supports 2 connected by the leads 3 with the motor. Pivotally mounted within their length to the supports 2 are the switch blades 4, curved outwardly at one end as at 5, and connected at the other end by an insulating bar 6 to which is attached by the screw 7 a handle 8. The curved ends of the blades 4 are adapted to connect respectively with the spring contacts 9, 10 and 11, and the upper ends of the blades are adapted to be thrown into engagement with the respective spring contacts 12, 13 and 14.

A suitable switch locking pawl 15 is pivotally mounted, as at 16, to a support 17 carried by the panel board, and the pawl is provided on its under surface with a suitable recess 18 in which is adapted to rest a screw 19 carried by the center blade 4, when the blades of the switch are disengaged from both of the sets of spring contact fingers. The under surface of the outer end of the pawl 15 carries a suitable spring 20, which, when the switch is rapidly operated to disengage the blades 4 thereof from the spring contacts 9, 10 and 11 and throw the same into engagement with the spring contacts 12, 13 and 14, is struck by the screw 19, which, owing to the rapid movement of the switch, causes the pawl 15 to be forced upwardly a sufficient distance to permit the screw or lug 19 to pass the recess 18 and to enable the blades 4 to engage their respective spring fingers 12, 13 and 14.

The bar 6 carries a lug 21 which is adapted, when the upper ends of the blades 4 are in contact with the spring fingers 12, 13 and 14 to be engaged by the retaining pawl 22 pivotally mounted, as at 23, to a support 24 carried by the panel 1. A switch releasing bar 25 of non-conducting material extends beneath the switch blades 4 above the supports 2 therefor, and said bar 25 is slidably mounted on guides 26, and is normally forced outwardly by the springs 27. The bar 25 releases the blades 4 from the contacts 12, 13 and 14 on the disengagement of the retaining pawl 22 from the lug 21.

Adjacent to the contacts 9, 10 and 11 is positioned a transverse buffer bar 28, of non-conducting material, which receives the impact of the curved portion 5 of the blades 4 when the upper portion of the blades 4 is disengaged from their respective contacts. The bar is slidably mounted on guides 29 and is normally forced outwardly by the springs 30.

Secured by screws 31 to brackets 32 carried by the board 1 above the pawl 22 and arranged in triangular formation are the vertically disposed tubular solenoids A, B and C, the solenoid C being arranged directly above the pawl 22.

A lug 33 is carried by each bracket 32 and each of said lugs pivotally supports a lever 34 which is formed at its opposite ends with openings, and corresponding ends of the levers associated with solenoids A and B are immediately beneath the tubular portion of the solenoid C.

Pivotally mounted on the pivoted retaining pawl 22 is a member 35, to which is connected through the insulator 35', a controlling rod 36, the upper end of which coöperates with the outer end of the pivoted lever 34 associated with the solenoid C and carries the adjustable collars 37 which operate one on each side of the lever 34. A branch controlling rod 38 extends from the lower portion of the rod 36 and the same coöperates with the overlapping ends of the levers 34 associated with the solenoids A and B, and said rod 38 carries the adjustable collars 39 which operate one above and the other below the levers 34. A counter-balance weight 39' is carried by the retaining pawl, and an adjustable screw 39² carried by the support 24 regulates the engagement of the retaining pawl over the lug 21.

An armature 40 provided with a stem 41 is loosely mounted in each of the solenoids A, B and C, and the stems associated with the armature in the solenoids A and B are provided with the adjustable collars 42 for striking the outer ends of their coöperating arms 34 when the armatures are released. The stem 41 of the armature associated with the solenoid C carries an insulated handle 43 which enables the armature to be manually depressed and which contacts with its associated lever 34. Suitable closure plates 44 are positioned to close the upper end of the opening in each of the solenoids A, B and C, and the same are formed with openings through which operate the stems 41.

The solenoids A, B and C are connected at one end by the respective wires 45, 46 and 47 with the respective spring contact fingers 12, 13 and 14, and said solenoids are connected respectively at the other end by the wires 48, 49 and 50 with the respective fuse supports 51, 52 and 53. The fuse supports 51, 52 and 53 are connected respectively with the supports 54, 55 and 56 by the fuses 57, 58 and 59 of the well known construction. A current feed line 60 connects with each support 54, 55 and 56 and said supports are respectively connected by the wires 61, 62 and 63 with the spring contacts 9, 10 and 11.

The armatures are each preferably constructed in the following manner. The stem 41 extends through a cup-shaped member 64 and carries on its end a nut 65 and in said cup-shaped member are received one end of the cylindrical strands 66, the opposite ends of which are received in a cup-member 67. Tie members 68 pass through the upper cup 64 and the ends thereof are passed through the lower cup 67 and are twisted together, thus holding the strands 66 in position. Should it be found desirable a cover 70 may be positioned over the levers of the solenoids A and B.

Current being supplied to each of the wires 60 and the parts being in the position, as in the drawings, with the switch connecting the motor to the feed wires through the fuses, the apparatus operates in the following manner:—The presence of the current in the solenoids will maintain the armatures suspended therein and above the levers 34. Should the current in one or more of the supply wires 60 be interrupted for any reason, the armature in the solenoids associated with the interrupted supply wires would drop and actuate the lever 34 associated therewith, which would raise the retaining pawl 22 and permit the spring 27 to disengage the switch blades 4 from their respective spring contacts 12, 13 and 14, which will break the connection from the feed wires to the motor. It will be apparent that it is only necessary for the current to be interrupted on but one line to cause the parts to operate to disconnect the motor from the source of power. To position the switch to again operate the motor, it is necessary to first draw the same downwardly and hold it so that the curved ends 5 of the arms 4 engage their respective fingers 9, 10 and 11, at which time a circuit is completed from the feeds 60 through the contacts 9, 10 and 11 and supporting posts 2 to the wires 3 leading to the motor. When in starting position the switch is rapidly thrown upwardly into running position and the lower ends of the blades are disconnected from their respective starting contact fingers and the upper ends of the blades are thrown into contact with their respective contacts, at which time the circuit from the feeds 60 to the motor is completed through the fuses and solenoids, and the switch is retained in running position by the pivoted locking pawl 22 engaging over the projection 21.

When both ends of the switch blades are disengaged from the spring contacts the same rest on the buffer bars 25 and 28 and are prevented from being thrown into contact with the fingers until the switch is manually operated, as above stated.

It will be apparent that the lower ends of the switch blades are disconnected from their associated switches an instant before the upper ends of the blades are caused to engage their associated contacts.

Having thus described my invention what I claim is:—

1. A safety device for controlling the distribution of power from a feed wire comprising a controlling means, a circuit from said feed wire through said controlling means to the distributing point, another circuit direct from said feed wire to said distributing point, a knife switch having a plurality of curved blades pivotally supported within their length, one portion of said blades adapted when the switch is in one position to close said last mentioned circuit, the same portion of said blades adapted when the switch is in another position to break said last mentioned circuit and another portion of said blades adapted to close the circuit through said controlling means, means for controlling the cycle of operation of said switch in closing said circuits, means for locking said switch when closing the circuit through said controlling means, means actuated on the interruption of current flowing through said controlling means for releasing said locking means, and means for opening said switch on the release of said locking means.

2. A safety device of the class described, comprising a switch for controlling the distribution of power from a plurality of wires, means for normally locking the switch in closed position, a solenoid in circuit with each feed wire, an armature coöperating with each solenoid and maintained in suspension relative thereto by the current flowing through said solenoid associated therewith, a lever associated with each armature and coöperating with said locking means, said levers adapted to be operated to release said locking means on the movement of the armature associated therewith, due to the interruption of the current flowing through its respective solenoid, and means for opening said switch on the release of said locking means.

In testimony whereof I have signed my name to this specification in the presence of two subscribing witnesses.

LESTER SIEBENHAUER.

Witnesses:
HARRY A. TOTTEN,
D. B. RICHARDS.